May 2, 1939.　　R. J. JAUCH ET AL　　2,157,087

LIQUID DISPENSING APPARATUS

Filed Jan. 11, 1936　　4 Sheets-Sheet 1

Inventors
Robert J. Jauch
Fred W. Sturm
William M. Griffin
By Wilkinson, Huxley, Byron & Knight
Attys

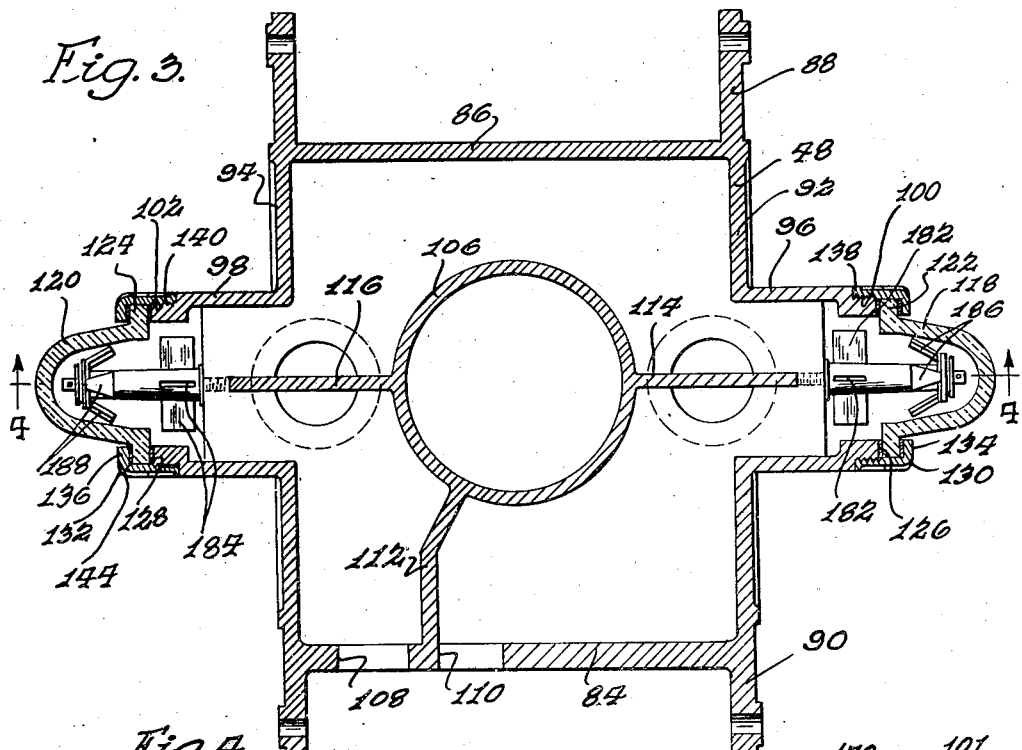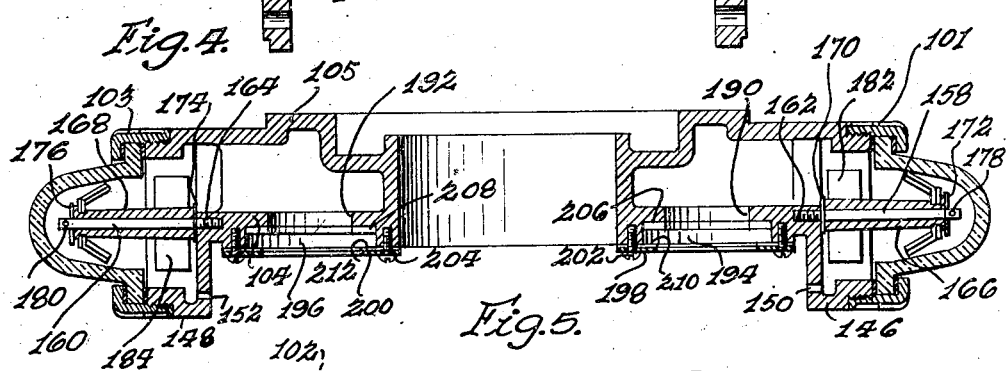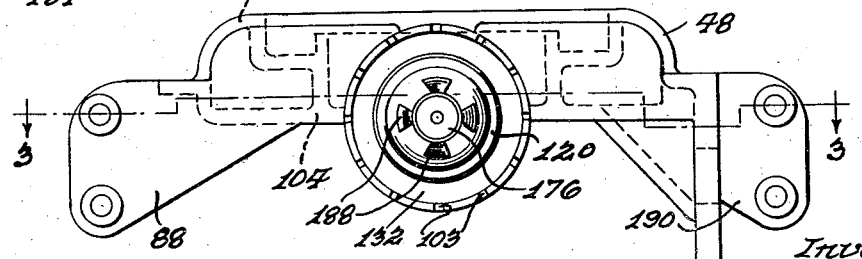

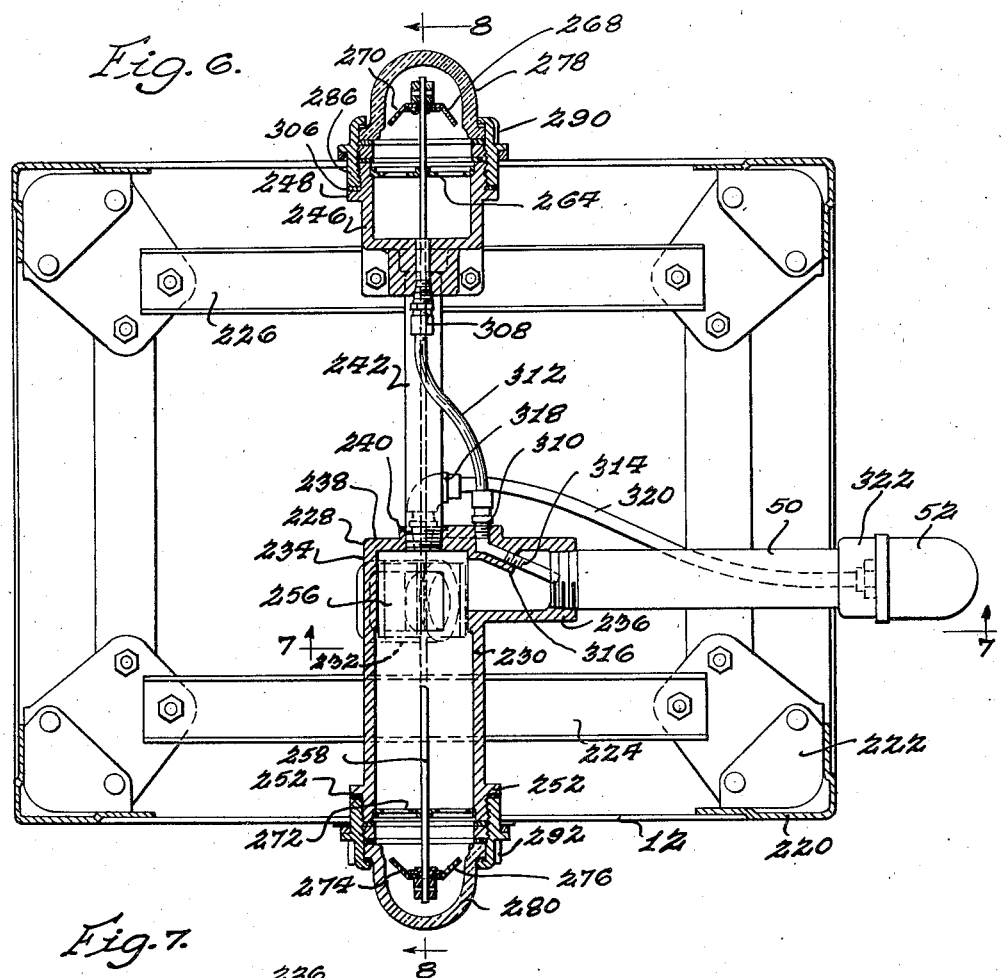
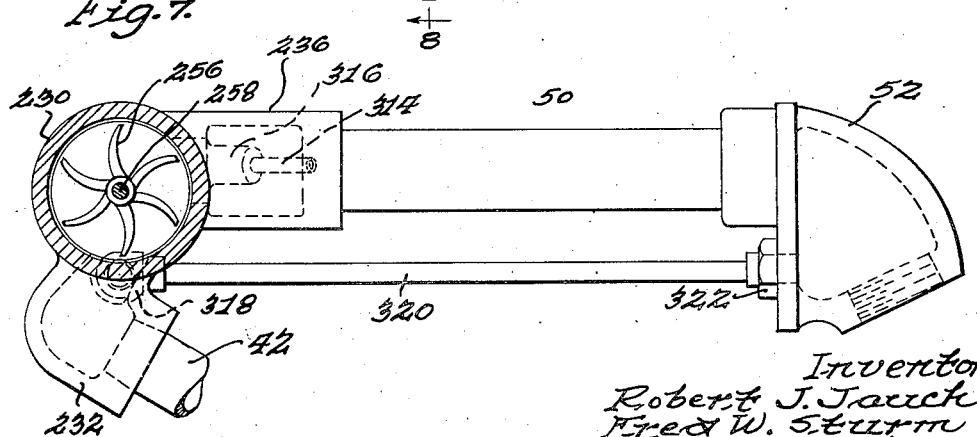

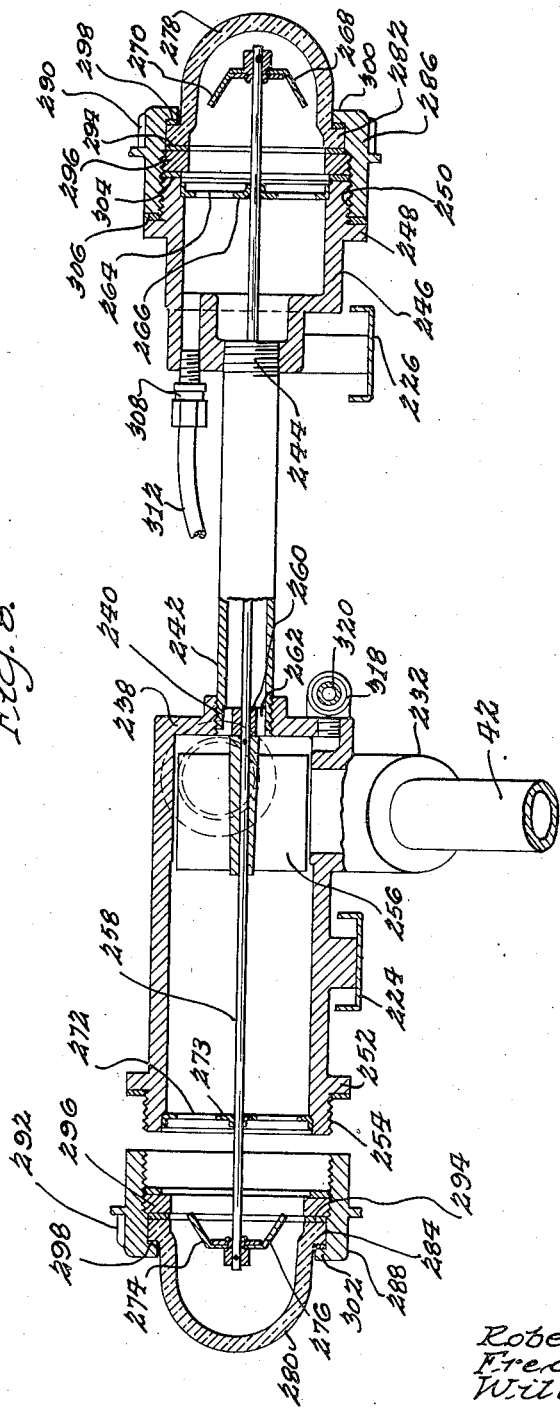

Patented May 2, 1939

2,157,087

UNITED STATES PATENT OFFICE 2,157,087

LIQUID DISPENSING APPARATUS

Robert J. Jauch, Fred W. Sturm, and William M. Griffin, Fort Wayne, Ind.; Willard Shambaugh and Frank J. Travers, both of Fort Wayne, Ind., coexecutors of William M. Griffin, deceased, assignors to The Wayne Pump Company, Fort Wayne, Ind., a corporation of Maryland Application January 11, 1936, Serial No. 58,770

9 Claims. (Cl. 116—117)

This invention pertains to liquid dispensing apparatus and more particularly to sight gauges for liquid dispensing apparatus so constructed and arranged as to be visible from any position around the liquid dispensing apparatus.

An object of the invention is to provide a liquid dispensing apparatus having connected sight gauges visible from any position around the apparatus.

Another object is to provide a sight gauge which is inexpensive to make and maintain and fulfills all conditions of manufacture and service.

A further object is to provide a sight gauge which is readily accessible and clearly indicates the passage of dispensed liquid through the liquid dispensing apparatus.

A yet further object is to provide a sight gauge which readily drains when the liquid level in the liquid dispensing apparatus falls, yet one which expels air therefrom when the liquid level is raised as by dispensing operation.

With these and various other objects in view, the invention may consist of certain novel features of construction and operation as will be more fully described and particularly pointed out in the specification, drawings and claims appended hereto.

In the drawings, which illustrate embodiments of the device, and wherein like reference characters are used to designate like parts—

Figure 3 is an enlarged sectional top plan view of the housing and sight gauge assembly, the same being taken substantially in the plane as indicated by the line 3—3 of Figure 5;

Figure 4 is an enlarged transverse sectional elevation taken substantially in the plane as indicated by the line 4—4 of Figure 3;

Figure 5 is an enlarged elevation of the sight gauge and housing thereof, the same looking toward the right as viewed in Figure 3;

Figure 6 is an enlarged top plan view of a modified form of sight gauge assembly embodying the invention;

Figure 7 is a side elevation partly in section of the device shown in Figure 6, the section being taken through the rotor, or substantially in the plane as indicated by the line 7—7 of Figure 6;

Figure 8 is a vertical elevation partly in section through the assembly shown in Figure 6, the same being taken substantially in the plane as indicated by the line 8—8 of Figure 6, one of the sight gauge glasses being shown in assembly but just prior to application to the housing.

Figures 1, 2:
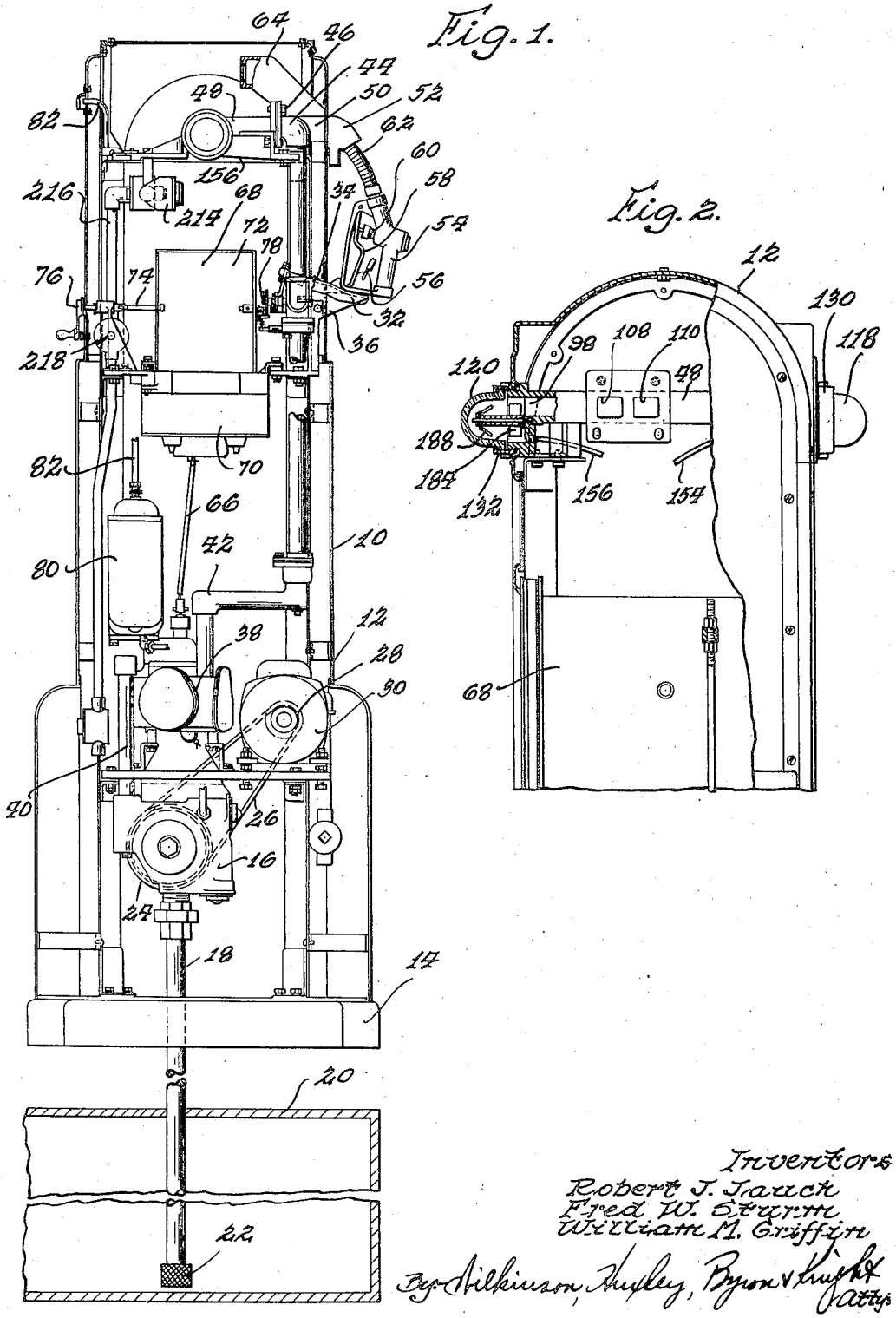
Figure 1 is a sectional elevation through a liquid dispensing apparatus embodying the invention.
Figure 2 is a fragmentary side elevation partly in section of the liquid dispensing apparatus and sight gauge assembly illustrated in Figure 1.

Referring first of all more particularly to the liquid dispensing apparatus and sight gauge assembly illustrated in Figures 1 to 5 inclusive, the liquid dispensing apparatus 10 consists essentially of the casing 12 supported on the pedestal 14. The pump 16 is supported within the casing 12, the suction side of said pump being connected through the pipe 18 to the source of liquid supply 20, a suitable foot valve 22 being provided to prevent drain-back of the liquid while the apparatus is inoperative.

The pump is provided with the pulley 24 connected as by means of the belt 26 to the pulley 28 provided on the motor 30, the motor being controlled through a suitable switch (not shown) connected to the switch control member 32 pivoted as at 34 to the casing adjacent the hose hook support 36.

The outlet side of the pump 16 is connected to the inlet side of the meter 38 through the pipe 40. The meter is shown as of the displacement type, the outlet side of said meter being connected through the piping 42, the piping 42 being provided with the fitting 44 adapted to be secured as at 46 to the sight gauge housing 48. The outlet side of the housing 48 is connected through the piping 50 to the fitting 52 to which the usual dispensing hose (not shown) is connected, the opposite end of said hose being connected in the usual manner to the dispensing nozzle 54. The nozzle 54 includes the nozzle guard 56 shown supported on the hose support 36 and within the nozzle guard there is pivoted the operating lever 58 adapted to control operation of the dispensing valve 60. The nozzle end 62 is shown extending into the guard housing 64 to prevent unauthorized dispensing operation when the pump is locked out of use.

The meter 38 is provided with the usual rotatable valve to which the meter shaft 66 is secured, the upper end of said meter shaft being adapted to operate the register and computing assembly 68. In the form of construction shown, the register or clock assembly is of the computing type such as shown and described in Patent No. 2,111,996, Edward A. Slye, granted March 22, 1938, wherein the variator indicated generally at 70 is adapted to be operated by the meter shaft 66 and in turn operates the counter mechanism 72 for indicating both the quantity of liquid dispensed and the cost of said liquid dispensed.

The register mechanism is provided with the set-back shaft 74 adapted to be controlled by the reset crank 76, the opposite end of said shaft having cooperative relation to reset interlocking mechanism indicated generally at 78, said mechanism permitting or preventing operation of the switch control member 32 and consequently permitting or preventing dispensing of the liquid until the register has been reset to zero.

The usual air separator 80 may likewise be connected to the meter on the inlet side thereof, the released air being exhausted at a high point in the liquid dispensing apparatus through the piping 82.

Referring now more particularly to the sight gauge assembly, the housing 48 consists essentially of the opposite spaced side walls 84 and 86, supporting brackets 88 and 90 being provided thereon for receiving suitable securing means for fastening the housing to the casing or corner posts thereof. Spaced front walls 92 and 94 are provided, each of said walls having offset portions 96 and 98 suitably threaded as at 100 and 102 adjacent the ends thereof. The housing is closed by means of the upper and lower walls 105 and 104 connected by the center wall 106 shown as of cylindrical construction, permitting the passage of wiring and the like into the upper portion of the liquid dispensing apparatus should such be desired.

The side wall 84 is provided with the inlet opening 108 and the outlet opening 110 separated by means of the dividing wall 112 extending from the center wall 106 to the outer wall 84. The housing is also provided with oppositely extending radial ribs 114 and 116 extending between the upper and lower walls and integral therewith and extending from the center wall outwardly to the offset portions 96 and 98 respectively but terminating short of the ends of said offset portions. On each of the offset portions 96 and 98 there is seated a substantially dome shaped transparent member 118 and 120 forming a so-called "bull's eye" sight gauge, the members 118 and 120 being formed of material such as glass and being flanged as at 122 and 124 and seated on the offset members 96 and 98 respectively, through a gasket such as a cork gasket 126 and 128 to which some material such as litharge or red lead may be applied.

The members 118 and 120 are retained in operative position by means of a circular apertured nut or collar 130 and 132 flanged as at 134 and 136 to overlie the flanges 122 and 124 of the sight gauge, said collars being threaded as at 138 and 140 to engage the threads 100 and 102 respectively and provided with the lugs 101 and 103 to receive a suitable wrench to facilitate application and removal of said collar. The joint between the flanges 134 and 122, and the flanges 136 and 124 is maintained tight preferably through gaskets 144 likewise liquid-proofed by litharge or the like. A portion of each of the ends of offset portions 96 and 98 is circular in cross-section and extends below the bottom wall 104 of the housing such as shown at 146 and 148, and the spinner housings thus formed are preferably threaded as at 150 and 152 for receiving suitable piping 154 and 156 extending from a low point in the spinner housings to the fitting 52 whereby if the liquid level should drop for any reason such as a leaking foot valve or if the piping should be drained, the sight gauge will immediately completely drain so that any existing fault can be promptly remedied.

Oppositely extending spindles 158 and 160 are suitably threaded as at 162 and 164 into the bottom wall 104 and extend into the members 118 and 120. Said spindles are provided with the rotatable sleeves 166 and 168 seated on the inner and outer bearings or washers 170, 172, 174 and 176, and suitably secured as by means of pins 178 and 180. The inner portions of the sleeves 166 and 168 are provided with the vanes 182 and 184, providing substantially a turbine, and the outer ends of said spindles are provided with deflected vanes 186 and 188 forming spinners which are visible through the members 118 and 120.

The bottom wall of the housing 48 adjacent the ribs 114 and 116 may also be apertured as at 190 and 192, and glass members 194 and 196 may be secured thereto as by means of the clamping rings 198 and 200 suitably secured as at 202 and 204 for closing the housing. The litharged gaskets 206 and 208 are interposed between the respective glasses and the adjacent bottom wall of the housing and the litharged gaskets 210 and 212 are interposed between the respective rings 198 and 200 of the adjacent glass. The purpose of this aperture is to permit light to shine through the dispensed liquid so that at night the spinners 186 and 188 will be illuminated to clearly indicate the flow. A suitable electric bulb may be provided as at the socket 214 connected to the conduit 216 and controlled by the switch 218, the conduit being connected to a suitable source of electric supply (not shown).

Assuming the register 72 to be set to zero, and the nozzle 54 removed from the support, in order to dispense liquid it is only necessary to raise the switch control member 32 starting the motor 30. Starting the motor 30 will cause the pump 16 to draw liquid from the source of liquid supply, liquid passing through the meter 38, the piping 42 and into the inlet 108 of the sight gauge housing. Liquid introduced through the inlet 108 will pass around the rib 116 rotating the turbine 184 and causing rotation of the spinner 188. The liquid will then continue around the center wall 106 and around the rib 114 causing rotation of the turbine 182 and consequently the spinner 186. The liquid will then pass outwardly of the outlet 110 through the connection 50 out the dispensing hose and nozzle, it being assumed that the nozzle valve has been kept open by means of the operating lever 58. With this assembly it will be appreciated that repairs can readily be made as the members 118 and 120 can be readily removed by simply removing the associated collars 130 and 132 facilitating cleaning out of the sight gauge.

While the spinner housings have been illustrated in a series circuit of the liquid being measured, it will be understood, of course, that other circuits for accomplishing similar results may be utilized.

Referring now more particularly to the construction illustrated in Figures 6, 7 and 8, the corner posts 220 of the pump casing 12 are provided adjacent the upper portion thereof with the brackets 222, to which the space supports 224 and 226 are secured at opposite sides of the pump. The transversely extending sight gauge housing 228 is disposed to be supported on the members 224 and 226, said housing consisting essentially of the manifold 230 provided with the downwardly disposed inlet 232 adapted to receive liquid from the upwardly extending discharge pipe, such as the pipe 42 shown in Figure 1. The inlet 232 communicates with the turbine or rotor housing 234, said housing communicating with the substantially horizontally extending discharge member 236 adapted to be connected to the pipe 50 which in turn is connected to the fitting 52 to which the discharge hose is connected.

The manifold 230 is provided with the end wall 238 which is connected as by the threads 240 to the outwardly extending tube 242 threaded as at 244 to the spinner housing 246, said housing corresponding to the offset portion 98 of the first mentioned device, being provided with the shoulders 248 disposed adjacent the threaded end portion 250. The outer end of the manifold 230 is provided with the shoulders 252 corresponding to the shoulders 248 and the threaded end portion 254 corresponding to the threaded portion 250.

The turbine or rotor 256 is disposed in the chamber or housing 234 and is mounted on the transversely extending shaft 258, said shaft being journaled as at 260 in the spider 262 provided in the tube 242 adjacent the end wall 238. One end of the shaft extends into the casing 246 and through the apertured stabilizing disc 264 which also acts as a bearing for the shaft as at 266. The outer end of said shaft is spaced outwardly of the end of said casing and is provided with the spinner 268 provided with the deflected vanes 270, the opposite end of the shaft extending through the apertured stabilizing disc 272 providing the journal 273 and is provided adjacent the end thereof with the spinner 274 likewise provided with the deflected vanes 276.

The ends of the housing 246 and the housing 228 are adapted to be closed by the domed transparent members 278 and 280, said members being similar to the members 118 and 120. The members 278 and 280 are flanged as at 282 and 284 and are adapted to be held in position by means of the collars 286 and 288 provided with the lugs 290 and 292 to facilitate the assembly. The gasket 294 is interposed between each domed member and backing nut 296 which is threaded on the respective collars 286 and 288 for assembling the members 278 and 280 with their respective collars, gasket 298 being interposed between the flanges 282 and 284 and the respective inwardly extending flanges 300 and 302 of the respective collars. With this assembly breakage of the transparent members is prevented in assembling the transparent members with the housing, particularly in field repair work, as the unit is applied as a whole as shown at the left of Figure 8, thereby relieving the flanges of the domed members from strain. The whole assembly of the transparent member, the respective collar and the backing nut are then threaded in place on the threads 250 and 254, suitable gaskets 304 and 306 being interposed between the backing nut and the adjacent housing and the collar and the adjacent housing. As before, all gaskets are applied with liquid-proofing, as litharge, or other suitable material.

As the housing 246 is connected to the housing 228 through the tube 242 in order to exhaust the air or vapor from the sight gauge member 278 to permit the flow of liquid thereto, a fitting 308 is tapped into the housing 246 adjacent a high point therein, and said fitting 308 is connected to the fitting 310 by means of the tube 312. The fitting 310 is provided with a tube 314 extending through the boss 316 into the outlet member 236 so as to extend into the path of discharge whereby liquid passing outwardly tends to draw the air from the housing 246, thus facilitating the passage of liquid into the sight gauge member 278. The turbine casing 234 is likewise provided with the fitting 318 adjacent a low point thereof, preferably below the rotor, and the tube 320 is connected through the fitting 322 to the member 52. Thus, should the bevel of liquid fall in the device due to leaky foot valve or the like, the sight gauge will be drained, indicating that such a condition exists.

In operation of this form of the device, liquid enters the turbine housing through the inlet 232 revolving the turbine 256, the liquid then passing outwardly through the outlet 236, the discharge pipe 50, the fitting 52 and the discharge hose in a manner already described. Rotation of the turbine 256 causes rotation of the shaft 258, thus rotating the spinners 268 and 274, thus indicating that liquid is being dispensed, it being understood that liquid will completely fill the transparent members in the sight gauge.

Illumination may be effected externally of the device through suitable lighting effects or inwardly of the device through suitable glass means such as shown at 194 and 196 of Figure 4, this having been omitted in Figures 6 and 8 as a matter of convenience.

It is to be understood that we do not wish to be limited by the exact embodiments of the device shown, which are merely by way of illustration and not limitation, as various and other forms of the device will of course be apparent to those skilled in the art without departing from the spirit of the invention or the scope of the claims.

What is claimed is:

1. In a sight gauge for a liquid dispensing apparatus, the combination of a housing having a central wall, spaced side walls and top and bottom walls, a substantially radial dividing wall extending from said central wall to one of the side walls, said last named side wall having an opening on each side of said dividing wall forming an inlet and an outlet to said housing, opposite side walls adjacent said last named side wall having offset portions, a protruding dome-like transparent member secured to each of said offset portions, radial ribs extending from said central wall toward and into said offset portions but terminating inwardly thereof, a rotatable member pivotally mounted in each of said offset portions and having indicating vanes disposed in said transparent member, and operating vanes on said rotatable member disposed in said offset portion whereby passage of liquid through said housing between said inlet and outlet will cause rotation of said rotatable member by liquid being directed toward said operating vanes by the adjacent ribs.

2. In a sight gauge for a liquid dispensing apparatus, the combination of a housing having a rotor chamber and an inlet and an outlet therefor, a spinner housing spaced from said first named housing and axially aligned therewith, a hollow tube connecting said housings, a hollow connection between said spinner housing and the outlet side of said first named housing for removing vapor from said spinner housing, a protruding dome-like transparent member removably secured to each of said housings, a rotor rotatably mounted in said chamber and adapted to be revolved by liquid flowing from said inlet to said outlet, a shaft connected to said rotor and extending into said transparent members through said first named housing and said hollow tube, respectively, and a spinner provided adjacent each end of said shaft.

3. In a sight gauge for a liquid dispensing apparatus, the combination of a housing having a rotor chamber and an inlet and an outlet therefor, a spinner housing spaced from said first named housing and axially aligned therewith, a hollow tube connecting said housings, a hollow connection between said spinner housing and the outlet side of said first named housing for removing vapor from said spinner housing, a protruding dome-like transparent member removably secured to each of said housings, a rotor rotatably mounted in said chamber and adapted to be revolved by liquid flowing from said inlet to said outlet, a shaft connected to said rotor and extending into said transparent members through said first named housing and said hollow tube, respectively, a spinner provided adjacent each end of said shaft, an outlet member connected to the outlet side of said first named housing, and a hollow connection between the first named housing and said outlet member below said rotor for the purpose set forth.

4. In a sight gauge for a liquid dispensing apparatus, the combination of a housing having a rotor chamber and an inlet and an outlet therefor, a spinner housing spaced from said first named housing and axially aligned therewith, hollow means connecting said first named housing and spinner housing forming communication therebetween, a protruding dome-like transparent member removably secured to each of said housings, said hollow means being so disposed as to cause the dome-like member connected thereto to be filled with liquid to be dispensed, a rotor rotatably mounted in said rotor chamber and adapted to be revolved by liquid flowing from said inlet to said outlet, a shaft connected to said rotor and extending into said transparent members, a spinner provided adjacent each end of said shaft, and means connecting said housing and spinner chamber for removing air or vapor from said spinner chamber when liquid passes from said inlet to said outlet.

5. In a sight gauge for a liquid dispensing apparatus, the combination of a housing having a rotor chamber and an inlet and an outlet therefor, a spinner housing spaced from said first named housing and axially aligned therewith, means connecting said first named housing and spinner housing forming communication therebetween, a protruding dome-like transparent member removably secured to each of said housings, a rotor rotatably mounted in said chamber and adapted to be revolved by liquid flowing from said inlet to said outlet, a shaft connected to said rotor and extending into said transparent members, a spinner provided adjacent each end of said shaft, an outlet member connected to the outlet side of said first named housing and a hollow connection between the first named housing and said outlet member below said rotor.

6. In a sight gauge for a liquid dispensing apparatus, the combination of a housing having a rotor chamber and an inlet and an outlet therefor, a spinner housing spaced from said first named housing and axially aligned therewith, a hollow tube connecting said housings, a hollow connection between said spinner housing and the outer side of said first named housing for removing vapor from said spinner housing, a protruding dome-like transparent member removably secured to each of said housings, a rotor rotatably mounted in said chamber and adapted to be revolved by liquid flowing from said inlet to said outlet, a shaft connected to said rotor and extending through said first named housing and said hollow tube, respectively, into said transparent members, and a spinner provided on said shaft in each of said housings.

7. In a sight gauge for a liquid dispensing apparatus, the combination of a housing having a rotor chamber and an inlet and an outlet therefor, a spinner housing spaced from said first named housing and axially aligned therewith, a hollow tube connecting said housings, a protruding dome-like transparent member removably secured to each of said housings, said hollow tube being connected to said spinner housing adjacent the upper part thereof for removing vapor from said spinner housing, a rotor rotatably mounted in said chamber and adapted to be revolved by liquid flowing from said inlet to said outlet, a shaft connected to said rotor and extending through said first named housing, into said spinner housing, and into said transparent members, and a spinner provided on said shaft in each of said housings.

8. In liquid dispensing apparatus, the combination of a casing, discharge means, connected sight gauges mounted on different sides of said casing and protruding therefrom, said gauges including transparent members and associated housing means supported by said casing and connected to said discharge means, movable means disposed in said transparent members and housing means and actuated by liquid passing through said housing means upon discharge from said discharge means, said transparent members being so disposed and protruding that at least one of said transparent members and the movable means therein is visible from substantially any position around said liquid dispensing apparatus.

9. In liquid dispensing apparatus, the combination of a casing, discharge means, connected sight gauges mounted on opposite sides of said casing and protruding therefrom, said gauges including transparent members and associated housing means supported by said casing and connected to said discharge means, movable means disposed in said transparent members and housing means and actuated by liquid passing through said housing means upon discharge from said discharge means, said transparent members being so disposed and protruding that at least one of said transparent members and the movable means therein is visible from substantially any position around said liquid dispensing apparatus.

ROBERT J. JAUCH.
FRED W. STURM.
WILLIAM M. GRIFFIN.